United States Patent
Tan et al.

(10) Patent No.: US 10,761,526 B2
(45) Date of Patent: Sep. 1, 2020

(54) SYSTEMS AND METHOD FOR ROBOTIC INDUSTRIAL INSPECTION SYSTEM

(71) Applicant: General Electric Company, Schenectady, NY (US)

(72) Inventors: Huan Tan, Clifton Park, NY (US); Li Zhang, Clifton Park, NY (US); Romano Patrick, Niskayuna, NY (US); Viktor Holovashchenko, Watervliet, NY (US); Charles Burton Theurer, Alplaus, NY (US); John Michael Lizzi, Jr., Wilton, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 352 days.

(21) Appl. No.: 15/804,767

(22) Filed: Nov. 6, 2017

(65) Prior Publication Data

US 2019/0137995 A1  May 9, 2019

(51) Int. Cl.
*G05B 19/04* (2006.01)
*G05D 1/00* (2006.01)
*H04L 9/06* (2006.01)
*G06F 16/951* (2019.01)
*H04L 29/06* (2006.01)

(52) U.S. Cl.
CPC ......... *G05D 1/0022* (2013.01); *G06F 16/951* (2019.01); *H04L 9/06* (2013.01); *H04L 63/0428* (2013.01); *G05D 2201/0207* (2013.01); *Y10S 901/44* (2013.01)

(58) Field of Classification Search
CPC .......... G05D 1/0022; G05D 2201/0207; G06F 16/951; H04L 63/0428; H04L 9/06; Y10S 901/44
See application file for complete search history.

(56) References Cited

U.S. PATENT DOCUMENTS

| | | | |
|---|---|---|---|
| 9,477,936 B2 | 10/2016 | Lawson et al. | |
| 10,013,821 B1* | 7/2018 | Dudar | G05D 1/0293 |
| 2011/0035068 A1 | 2/2011 | Jensen | |
| 2015/0066782 A1 | 3/2015 | Vainberg et al. | |

(Continued)

FOREIGN PATENT DOCUMENTS

| | | |
|---|---|---|
| CN | 105805560 A | 7/2016 |
| CN | 106476547 A | 3/2017 |

(Continued)

OTHER PUBLICATIONS

Omari, Sammy, et al.; "Visual industrial inspection using aerial robots", Applied Robotics for the Power Industry (CARPI), 2014 3rd International Conference on, pp. 1-5, 2014, Foz do Iguassu.

(Continued)

*Primary Examiner* — Harry Y Oh
(74) *Attorney, Agent, or Firm* — Fletcher Yoder, P.C.

(57) ABSTRACT

An asset inspection system includes a robot and a server. The server receives a request for data from the robot, wherein the requested data comprises an algorithm, locates the requested data in a database stored on the server, encrypts the requested data, and transmits the requested data to the robot. The robot is configured to collect inspection data corresponding to an asset based at least in part on the requested data and transmit the collected inspection data to the server.

18 Claims, 6 Drawing Sheets

(56) References Cited

U.S. PATENT DOCUMENTS

| | | | |
|---|---|---|---|
| 2015/0148949 A1* | 5/2015 | Chin | G05D 1/0246 |
| | | | 700/245 |
| 2015/0312219 A1 | 10/2015 | Miller et al. | |
| 2016/0246297 A1 | 8/2016 | Song | |
| 2016/0253563 A1 | 9/2016 | Lam et al. | |
| 2016/0307447 A1* | 10/2016 | Johnson | B60L 58/12 |
| 2017/0195627 A1* | 7/2017 | Sham | H04N 5/23238 |
| 2017/0206648 A1 | 7/2017 | Marra et al. | |
| 2018/0061251 A1* | 3/2018 | Venkatraman | B64C 39/024 |
| 2018/0259955 A1* | 9/2018 | Noto | B64C 39/024 |
| 2019/0066317 A1* | 2/2019 | Chang | G06T 5/002 |

FOREIGN PATENT DOCUMENTS

| | | |
|---|---|---|
| CN | 106848922 A | 6/2017 |
| EP | 2704401 A1 | 3/2014 |

OTHER PUBLICATIONS

Vick, Axel, et al.; "Robot control as a service—Towards cloud-based motion planning and control for industrial robots" Robot Motion and Control (RoMoCo), 2015 10th International Workshop on, pp. 33-39, 2015, Poznan.

International Search Report and Written Opinion for PCT Application No. PCT/US2018/055598, dated Jan. 31, 2019, 14 pgs.

* cited by examiner

SYSTEMS AND METHOD FOR ROBOTIC INDUSTRIAL INSPECTION SYSTEM

BACKGROUND

The subject matter disclosed herein relates to asset inspection, and more specifically to coordinating the inspection of one or more assets by one or more robots.

Various entities may own or maintain different types of assets as part of their operation. Such assets may include physical or mechanical devices, structures, or facilities which may, in some instances, have electrical and/or chemical aspects as well. Such assets may be used or maintained for a variety of purposes and may be characterized as capital infrastructure, inventory, or by other nomenclature depending on the context. For example, assets may include distributed assets, such as a pipeline or an electrical grid as well as individual or discrete assets, such as an airplane, a wind turbine generator, a radio tower, a steam or smoke stack or chimney, a bridge or other structure, a vehicle, and so forth. Assets may be subject to various types of defects (e.g., spontaneous mechanical defects, electrical defects, as well as routine wear-and-tear) that may impact their operation. For example, over time, the asset may undergo corrosion or cracking due to weather or may exhibit deteriorating performance or efficiency due to the wear or failure of component parts.

Typically, one or more human inspectors may inspect, maintain, and repair the asset. For example, the inspector may locate corrosion on the asset, may locate and quantitatively or qualitatively assess cracks or defects on the asset, may assess an asset for the degree of wear-and-tear observed versus what is expected, and so forth. However, depending on the location, size, and/or complexity of the asset, having one or more human inspectors performing inspection of the asset may take away time for the inspectors to perform other tasks or may otherwise be time consuming and labor intensive, requiring personnel time that might be more productively spent elsewhere. Additionally, some inspection tasks may be dull, dirty, or may be otherwise unsuitable for a human to perform. For instance, some assets may have locations that may not be accessible to humans due to height, confined spaces, or the like. Further, inspections may be performed at times that are based on schedules resulting in either over-inspection or under-inspection.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below.

In one embodiment, an asset inspection system includes a robot and a server. The server receives a request for data from the robot, wherein the requested data comprises an algorithm, locates the requested data in a database stored on the server, encrypts the requested data, and transmits the requested data to the robot. The robot is configured to collect inspection data corresponding to an asset based at least in part on the requested data and transmit the collected inspection data to the server.

In another embodiment, an asset inspection robot includes a drive system, a sensing system, a network interface, and a control system. The drive system includes a motor. The sensing system includes one or more sensors that collect data corresponding to an asset. The network interface communicates with a server. The control system requests data from the server via the network interface, receives the requested data from the server, controls the robot during inspection of the asset based on the requested data, collects inspection data during the inspection of the asset, and transmits the inspection data to the server via the network interface. The control system includes a mission planning system that generates a plan for inspection of the asset.

In a further embodiment, a method of inspecting an asset includes requesting a first data set from a remote server, receiving the first data set from the remote server, wherein the first data set is encrypted, decrypting the first data set, controlling a robot to perform an inspection of an asset based on the first data set, collecting a second data set during the inspection of the asset, encrypting the second data set, and transmitting the second data set to the remote server. The first data set, the second data set, or both comprise an algorithm, wherein the algorithm is encrypted by defining one or more primitives of the algorithm and encrypting a sequence of the one or more primitives of the algorithm.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
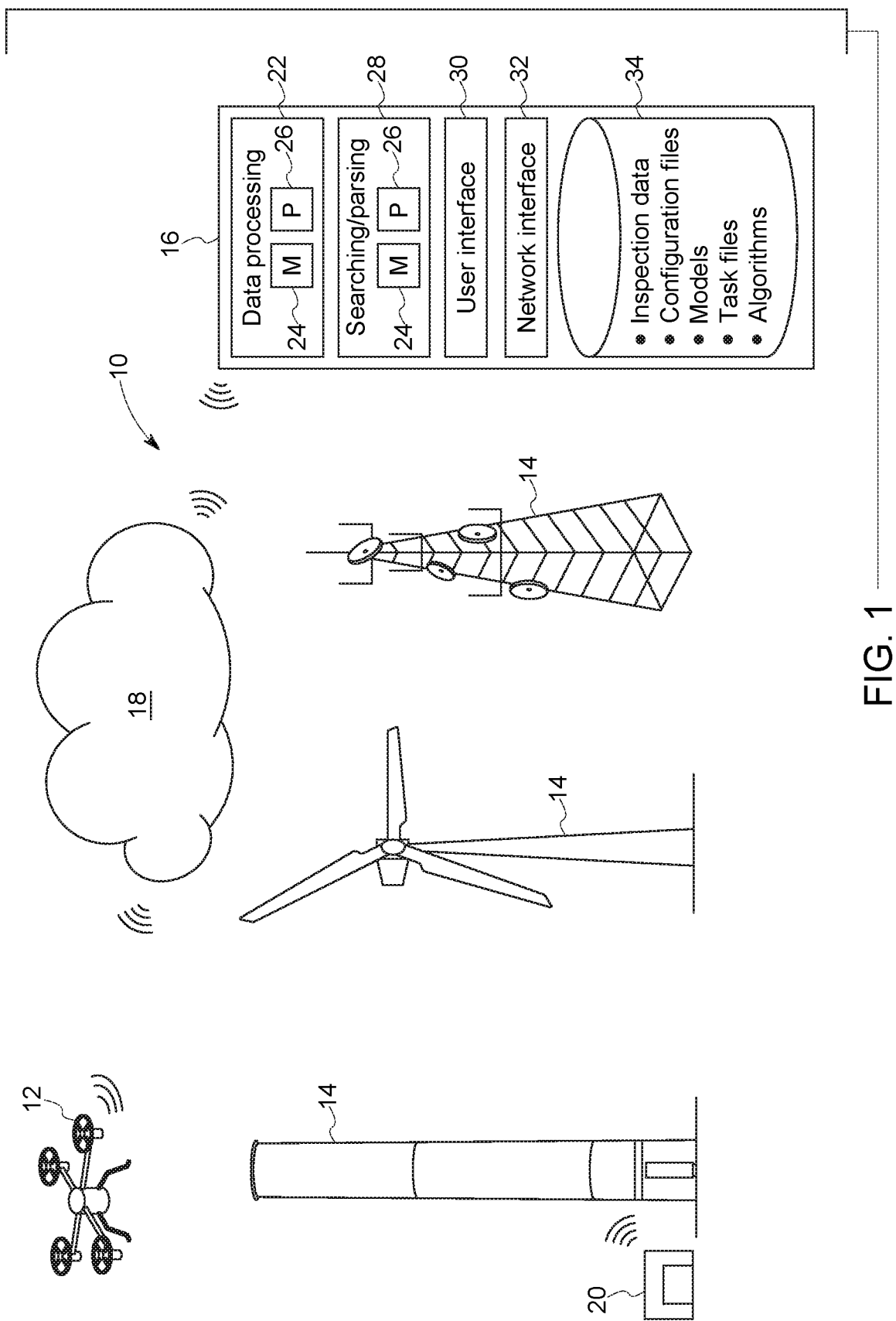
FIG. 1 illustrates an asset inspection system and various types of assets suitable for inspection, in accordance with an embodiment.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As discussed herein, the present approach relates to inspections of assets using robots, unmanned vehicles, or drones and/or inspections implemented by automated or computer-based routines. By way of example, such inspections may be performed using unmanned or robotic devices, such as ground-based mobile robots, including those with legs, wheels, tracks, etc., unmanned aerial vehicles (UAVs), including fixed wing and rotary wing vehicles, unmanned submersible vehicles (USVs), which may swim or move along the floor of the body of liquid, or other autonomously moving vehicles that may be characterized as drones or robots. For simplicity, to the extent the terms "drone" and "robot" are used herein, though it should be appreciated that this terminology is intended to encompass all variations, of UAVs, USVs, robotic devices, and so forth that are capable of programmable movement with no or limited human oversight. Such programmable movement can be based on either locally generated path waypoints or guidance or path guidance and waypoints generated by a remote system and communicated to the robot. Thus, as used herein, such devices move during an operational phase or period entirely or primarily without direct human intervention or control and/or with limited human intervention or oversight. In accordance with present approaches, such devices may be operated to move along a flight plan, along which the devices acquire inspection data, such as video or still image data, LIDAR data, acoustic data, spectroscopic data, temperature or pressure data, or other data that can be acquired by sensors or cameras that can be affixed to a device moving along the flight plan. In general, such inspections may be performed on one or more assets including, but not limited to, power generation assets, communication assets, transportation assets, mining or underground pumping assets, manufacture or construction assets and so forth.

Though the phrase "flight plan" is used generally herein, it should be appreciated that this phrase does not necessitate aerial movement, but instead relates to any one-dimensional (1D) (such as along a track), two-dimensional (2D) (such as along a defined or undefined planar route), or three-dimensional (3D) (such as movement in the air, under water, or on a structure in where depth or altitude is also traversable), or four-dimensional (4D) (such as where there are defined temporal aspects that may characterize a velocity, acceleration, or a time on station at a waypoint) path or route along which a drone moves as part of an inspection plan. Thus, a "flight plan" as used herein may be characterized as any 1D, 2D, 3D, or 4D route or path along which device such as a drone or robot is moved to perform a sensor-based inspection of an asset. Such a path may be adaptive, as discussed herein, and may consist of one or more waypoints along which the robot proceeds in an ordered fashion, with the sequence and location of the waypoints defining the path or route. It should be appreciated that such a flight plan may also incorporate not only temporal and/or spatial locations, but also orientation and/or alignment instructions for movement along the path and/or to exhibit at a given waypoint. Thus, the flight plan may also specify parameters such as roll, pitch, and yaw for the drone to exhibit at different points along the flight plan as well as two- or three-dimensional alignment characteristics that may relate to the direction in which a sensor or camera is pointing at a point along the flight plan. Thus, the flight plan may address not only where or when a robot is with respect to an inspection site but, at a given location or waypoint, the direction the robot is facing or otherwise oriented with respect to. Further, even at the same waypoint and orientation, images may be acquired at different magnifications, wavelengths, or other optical parameter such that effectively the image constitutes a different view. As discussed herein, the present approach facilitates the inspection of assets by acquired sensor data gathered during an inspection.

In addition, in accordance with certain aspects, prior knowledge may be leveraged in the inspection process. For example, prior knowledge may be used in generating or modifying an adaptive flight plan. In certain aspects, machine learning approaches may be employed to learn from human reviewer decisions (e.g., regarding data sufficiency, mission planning, etc.), thereby creating a trained artificial neural network based on this prior knowledge that can facilitate future data sufficiency decisions.

To facilitate explanation and provide useful real-world context, various examples such as wind turbine generators, radio transmission towers, smokestacks, and so forth are provided herein. It should be appreciated however that such examples are provided merely to facilitate explanation, and the present approach is suitable for use with a wide range of other assets and at various other types of sites. Thus, the present approach is not intended to be limited to the context of the present examples.

With the preceding in mind, and turning to the figures, FIG. 1 depicts aspects of an inspection system 10 employing one or more robots 12 suitable for inspecting one or more assets 14, such as a wind turbine generator, radio tower, smokestack, or other suitable asset.

FIG. 1 also depicts a remote server 16, accessible via a cloud 18 (e.g., a network interface for accessing one or more remote servers virtual machines, etc. for storage, computing, or other functionality), which may communicate with the one or more robots 12 to coordinate operation of one or more robots 12, such as for inspection of an asset 14. In one embodiment, the robot(s) 12 have onboard cellular or network connectivity and can communicate with the remote server 16 at least prior to beginning an inspection. In certain implementations the cellular or network connectivity of the robot(s) 12 allow communication during an inspection, allowing inspection data to be communicated to the remote server 16 and/or allowing the remote server 16 to communicate changes to the flight plan to a given robot 12. Alternatively, changes to the flight plan may be determined by a processor internal to the robot 12, i.e., onboard, such as in the event the robot 12 is operating outside of communication range from the remote server 16.

As shown, in some embodiments, the system may also include a docking station 20 (e.g., robot garage), disposed on or near the asset 14, for short term or long term storage of the robot 12 before and/or after inspection. In some embodiments, the docking station 20 may be in communication with the remote server 16 via the cloud 18. If the robot 12 relies on a battery for power, the docking station 20 may also include a power source for charging the robot's 12 battery.

In the depicted example, the remote server 16 is a remote computing device accessible by the robot(s) 12 via the cloud 18. Though only a single remote server 16 is shown in FIG. 1, it should be understood that the functions performed by the remote server 16 may be performed by multiple remote servers 16 and/or by virtualized instances of a server environment. In the instant embodiment, the remote server 16 includes a data processing system 22, which may include a memory component 24 and a processor 26, for processing data received from the robot 12. As is described in more detail below, in some embodiments, the robot 12 may provide raw data to the remote server 16 for processing. In other embodiments, the robot 12 may pre-process or partially process the data before passing it to the remote server 16. In further embodiments, all of the data processing may be performed by the robot 12.

The remote server 16 also includes a searching/parsing component 28, which may also include a memory 24 and a processor 26, for searching, parsing, and otherwise interacting with data stored on the remote server 16. A user interface 30 may receive inputs from a user. For example, the data processing system 22 may utilize machine learning (e.g., a trained artificial neural network) that uses inputs from a user provided via the user interface 30. A network interface 32 facilitates communication between the robot(s) 12 via the cloud 18. As shown, the remote server 16 may store and maintain one or more databases 34. These databases 34 may include inspection data, configuration files, models of assets and/or areas surrounding assets, task files, algorithms, etc.

Following an inspection, the robot 12 may send inspection data to the remote server 16 for processing and/or storage. By way of example, videos, images, LIDAR data, depth sensor data, acoustic data, spectroscopic data, or other relevant sensor or camera data acquired by the one or more robots 12 during an inspection may be uploaded to the database 34 as acquired or as a batch after an inspection flight plan is completed. Alternatively, in other implementations, the inspection data may be provided to the database 34 by other means or channels, such as via direct transmission from the robot 12 and/or via other intermediary communication structures, such as a dedicated inspection data communication circuit.

In the depicted example, the data processing system 22, the database 34, and the searching/parsing component 28 are depicted as part of a single or common processor-based system. However, the depicted functionalities may be implemented in a distributed or dispersed manner, with certain aspects being local to the asset 14, to the robot 12, to an operational facility and/or other locations remote from the asset 14. In such distributed implementations, the depicted aspects may still be communicatively linked, such as over one or more network connections.

In the illustrated embodiment, each robot 12 makes a determination as to what files (e.g., models of assets 14, models of areas surrounding the assets 14, configuration files, algorithms, environmental data, etc.) are needed from the remote server 16, the robot 12 makes a request for the specified files, and the remote server 16 provides the files. However, other envisaged embodiments may utilize a more top-down approach in which the remote server 16 determines which files will be needed for an inspection and pushes the files to the robot(s) 12. The robot 12 then performs the one or more inspections and passes the collected data to the remote server 16. In some embodiments, the robot 12 may pre-process the data, or do some or all of the data processing before sending the data to the remote server 16.

Figure 2:
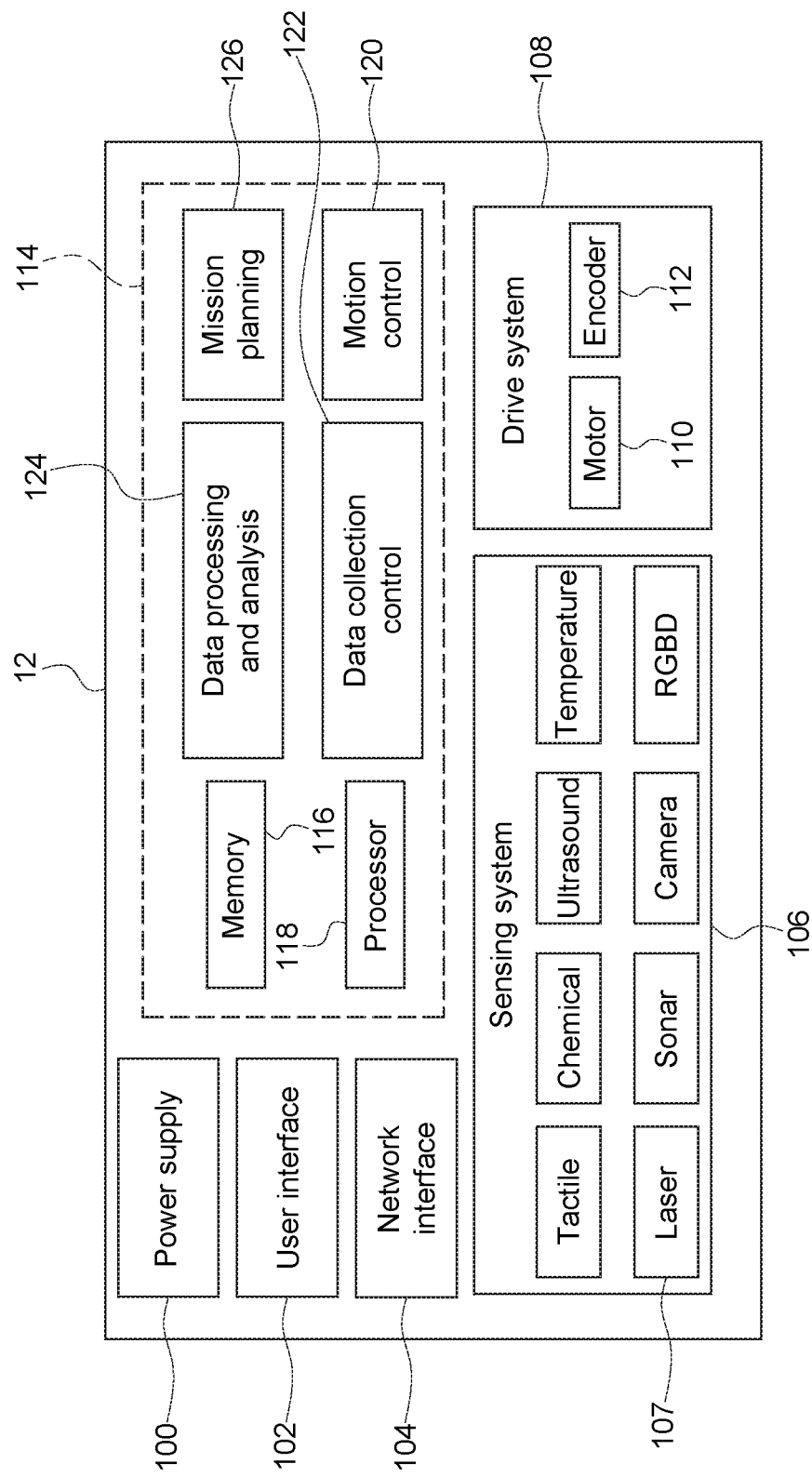
FIG. 2 is a schematic of a robot of the asset inspection system of FIG. 1, in accordance with an embodiment.

FIG. 2 is a schematic of an embodiment of the robot 12 shown in FIG. 1. It should be understood, however, that other embodiments of the robot 12 are envisaged having additional components, fewer components, and/or different combinations of components. As shown, the robot 12 includes a power supply 100 to provide power for the operation of the robot 12. The power supply 100 may include a replaceable or rechargeable battery, a combustion engine, a generator, and electric motor, a solar panel, a chemical-reaction based power generation system, etc., or some combination thereof.

The robot may include a user interface 102, by which a user may set up or adjust various settings of the robot 12. The user interface may include one or more input devices (e.g., knobs, buttons, switches, dials, etc.) and in some cases may include a display (e.g., a screen, array of LEDs, etc.) for providing feedback to the user.

A network interface 104 enables communication with the remote server 16 via the cloud 18, or other devices (e.g., the docking station 20, a remote controller, a smart phone, a computing device, a tablet, etc.). For example, the network interface 104 may enable communication via a wireless network connection, a wired network connection, cellular data service, Bluetooth, Near Field Communication (NFC), ZigBee, ANT+, or some other communication protocol.

A sensing system 106 may include one or more sensors 107 (e.g., tactile, chemical, ultrasound, temperature, laser, sonar, camera, a red, blue, green, depth (RGB-D) camera, etc.) configured to sense various qualities and collect data corresponding to the asset during inspections.

A drive system 108 may actuate movement of the robot 12 through the air, through a liquid, along a surface, or some combination thereof. As shown, the drive system 108 may include one or more motors 110 and one or more encoders 112. The one or more motors 110 may drive propellers, legs, wheels, tracks, etc. The one or more encoders 112 may sense one or more parameters of the one or more motors 110 (e.g., rotational speed) and provide data to a control system 114.

The control system 114 may include one or more memory components 116 and one or more processors 118. A motion control system 120 may receive a signal from the one or more encoders 112 of the drive system 108 and output a control signal to the one or more motors 110 to control the movement of the robot 12. Similarly, a data collection control system 122 may control the operation of the sensing system 106 and receive data from the sensing system 106. A data processing and analysis system 124 may receive data collected by the sensing system 106 and process or analyze the collected data. In some embodiments, the data processing and analysis system 124 may completely process and analyze the data and make a determination as to the condition of the asset. In other embodiments, the data processing and analysis system 124 may perform pre-processing of the data or a partial processing and analysis of the data and then send the data to the remote server for the remainder of processing and analysis. In further embodiments, the robot may send raw data to the remote server.

The control system 114 may also include a mission planning component 126. As is described in more detail below, the mission planning component 126, having been assigned an inspection mission, determines what additional files or data are needed from the remote server to complete the inspection mission and requests the additional information. Once the data is received from the remote server, the mission planning component 126 generates a mission plan and executes the mission plan by coordinating the various other components of the control system 114 and the robot 12. Either the control system 114 or the network interface 104 may be configured to encrypt data for transmission to the remote server or decrypt data received from the remote server.

Figure 3:
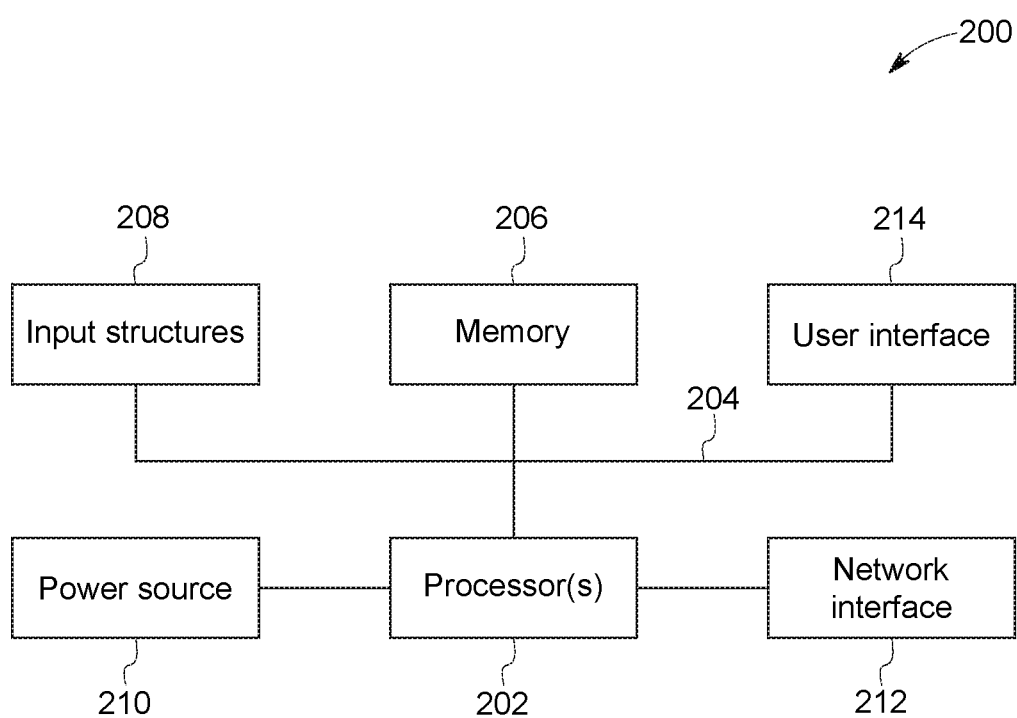
FIG. 3 is a block diagram of a remote server of the asset inspection system of FIG. 1, in accordance with an embodiment.

FIG. 3 generally illustrates a block diagram of example components of a computing device 200 that could be used as a remote server. As used herein, a computing device 200 may be implemented as one or more computing systems including laptop, notebook, desktop, tablet, or workstation computers, as well as server type devices or portable, communication type devices, such a cellular telephones, and/or other suitable computing devices.

As illustrated, the computing device 200 may include various hardware components, such as one or more processors 202, one or more busses 204, memory 206, input structures 208, a power source 210, a network interface 212, a user interface 214, and/or other computer components useful in performing the functions described herein.

The one or more processors 202 are, in certain implementations, microprocessors configured to execute instructions stored in the memory 206 or other accessible locations. Alternatively, the one or more processors 202 may be implemented as application-specific integrated circuits (ASICs), field-programmable gate arrays (FPGAs), and/or other devices designed to perform functions discussed herein in a dedicated manner. As will be appreciated, multiple processors 202 or processing components may be used to perform functions discussed herein in a distributed or parallel manner.

The memory 206 may encompass any tangible, non-transitory medium for storing data or executable routines, including volatile memory, non-volatile memory, or any combination thereof. Although shown for convenience as a single block in FIG. 3, the memory 206 may actually encompass various discrete media in the same or different physical locations. The one or more processors 202 may access data in the memory 206 via one or more busses 204.

The input structures 208 are used to allow a user to input data and/or commands to the device 200 and may include mice, touchpads, touchscreens, keyboards, and so forth. The power source 210 can be any suitable source for providing power to the various components of the computing device 200, including line and battery power. In the depicted example, the device 200 includes a network interface 212. Such a network interface 212 may allow communication with other devices on a network using one or more communication protocols. In the depicted example, the device 200 includes a user interface 214, such as a display configured to display images or date provided by the one or more processors 202. As will be appreciated, in a real-world context a processor-based systems, such as the computing device 200 of FIG. 3, may be employed to implement some or all of the present approach, such as performing the functions of the remote server shown in FIG. 1.

Figure 4:
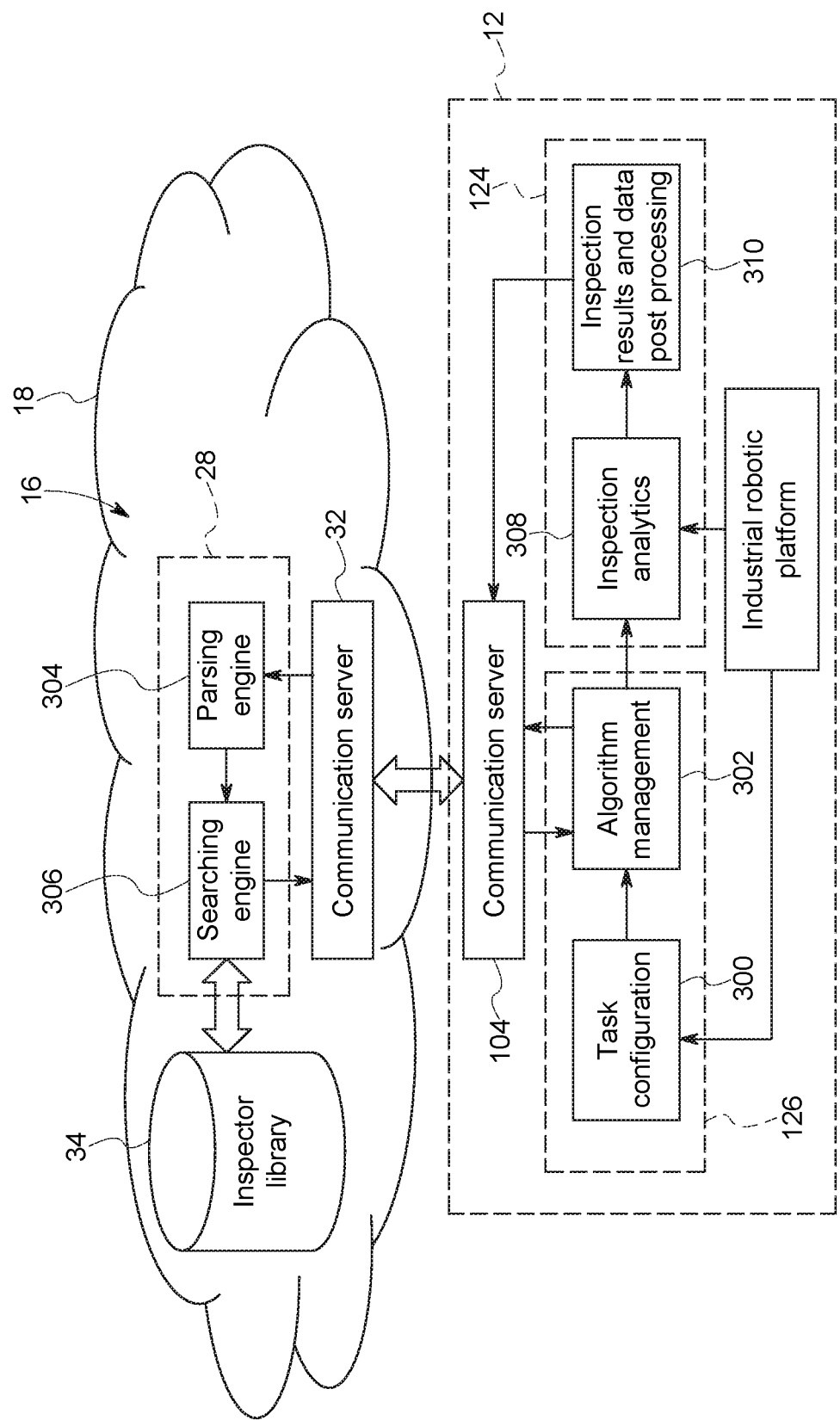
FIG. 4 is a schematic illustrating interactions between the robot and the remote server of the asset inspection system of FIG. 1, in accordance with an embodiment.

FIG. 4 is a schematic illustrating interactions between the robot 12 and the remote server 16. As previously described, the robot 12 and the remote server 16 communicate with one another via respective network interfaces 32, 104 (e.g., communication servers). As previously described with regard to FIG. 2, the robot 12 includes a mission planning system 126. The mission planning system 126 may include a task configuration component 300 and an algorithm management component 302.

The task configuration component 300 generates, modifies, and/or implements a configuration file. The configuration file generally defines where the robot 12 moves, what the robot 12 knows about its surrounding environment, how the robot 12 will go about performing the inspection, and what inspections analytics results the robot 12 should provide for a human operator to review. For example, the task configuration component 300 may generate, modify, and/or store information that describes the location, the surrounding environment, the asset, the target of interest, performance of the inspection, inspection information, customer information, report information, etc. Specifically, location information may include GPS information (e.g., the coordinates of the asset), whether the asset is indoor or outdoor, the best and/or permissible routes to get to the asset, etc. The surrounding environment information may include, for example, information about the surrounding terrain or geographical features around the asset, typical or forecasted weather, areas over which the robot 12 may or may not travel, etc. The asset information may include, for example, the name of the asset, the dimensions of the asset, the shape of the asset, a model of the asset, one or more materials of the asset, etc. The target of interest information may include information regarding one or more particular areas of the asset, the geometry of the target area, the size of the target area, the texture of the target area, the color of the target area, the expected condition of the target area, how to gauge the condition of the target area, etc. The performance of the inspection information may include, for example, the route or flight plan the robot 12 follows, the speed at which the robot 12 travels, the tolerance with which the robot 12 is expected to stick to the planned route, etc. The inspection information may include, for example, the name of the inspecting robot 12, the position of the inspecting robot 12, reporting data for the inspecting robot 12, and the information regarding the authority of the inspecting robot 12 to access algorithms, etc. The customer information may include the name of the client, their relationship to the inspecting entity, the customer's access to algorithms, etc. The report information may include, for example, images, video, text, or graphics, labeled raw data, pre-processed data, fully processed data, etc.

The algorithm management component 302 may be based on the information obtained from task configuration component 300, the algorithm management component 302 determines which algorithm(s) the robot 12 should use to perform the inspection task. This decision may be made, for example, by combining all the information and using a rule-based expert system. In the expert system, the input is the task definition. A matching process is deployed to search all of the candidate algorithms that can be used. The more detailed description the robot 12 can provide, the more accurate algorithm the robot 12 can obtain. In some embodiments, a definition may be also define one or more constraints on the algorithm searching mechanism. One or several candidate algorithms will be generated for the robot 12 to use. If there is only one algorithm, the robot 12 can request a download of the algorithm and download the algorithm from the server 16 directly. Otherwise, it will ask for guidance from human operators.

As previously described, the mission planning system 126 determines what additional files or data is need from the remote server 16 and requests the additional files or data from the mission planning system 126. Communication between the robot 12 and the remote server 16 may have separate channels for data transmission and algorithm transmission. For algorithm transmission, the robot 12 initiates a request to download a desired algorithm from the remote server 16. The algorithm request may contain, for example, the name of the algorithm, which is packaged in a data packet and sent using TCP/IP protocol. The remote server 16 may retain an algorithm contained in a source file, which describes the algorithm as a class, inherited from a basic algorithm class. The robot 12 loads the file into its mission planning system 126 and uses it to coordinate inspection. In some embodiments, related trained models are also transmitted to the robot 12.

For data transmission, all the collected data may be uploaded to the server continuously, in batches, or all at once following and inspection. The data may be raw, pre-processed, partially processed, or fully processed at the time of transmission. The transmitted data may then be stored in the cloud 18 (e.g., in a database 34 on a memory component of the remote server 16).

In some embodiments, transmitted data and/or transmitted algorithms may be encrypted. However, each communication channel may use a different method of encryption. For data encryption, standard data encryption techniques may be utilized, such as hashing (e.g., MD5, RIPEMD-160, RTRO, SHA-1, SHA-2, Tiger, WHIRLPOOL, RNGss, Blum Blum Shub, Yarrowm etc.), key exchange encryption (e.g., Diffie-Hellman key exchange), symmetric encryption methods (e.g., Advanced Encryption Standard (AES), Blowfish, Data Encryption Standard (DES), Twofish, Threefish, IDEA, RC4, Tiny Encryption algorithm, etc.), asymmetric encryption methods (e.g., Rivest-Shamir-Adlemen (RSA), DAS, ElGamal, Elliptic curve cryptography, NTRUEncrypt, etc.), or a combination thereof.

For algorithm transmission, encryption is structural. First, the primitives of the algorithm are defined. Because the algorithm is defined by the sequence of the primitives, the algorithms can be assembled by putting the known primitives in the described sequence. Thus, to encrypt the algorithm, the algorithm is deconstructed into a list of defined primitives and a sequence of the primitives. The sequence of the primitives is then encrypted by normal encryption methods. That is, the algorithm primitive sequencing may be encrypted by via hashing (e.g., MD5, RIPEMD-160, RTRO, SHA-1, SHA-2, Tiger, WHIRLPOOL, RNGss, Blum Blum Shub, Yarrowm etc.), key exchange encryption (e.g., Diffie-Hellman key exchange), symmetric encryption methods (e.g., Advanced Encryption Standard (AES), Blowfish, Data Encryption Standard (DES), Twofish, Threefish, IDEA, RC4, Tiny Encryption algorithm, etc.), asymmetric encryption methods (e.g., Rivest-Shamir-Adlemen (RSA), DAS, ElGamal, Elliptic curve cryptography, NTRUEncrypt, etc.), or a combination thereof.

Once the remote server 16 receives the request from the robot 12, a parsing engine 304 receives the name of a desired algorithm from the robot 12 and stores the algorithm name in the memory component. The parsing engine 304 then calls a searching engine 306 to find the source file of the desired algorithm in the database 34. The searching engine 306 uses a database searching tool to find the file associated with the name of the desired algorithm or the current inspection scenario on the database 34. The searching is based on matching. However, in some scenarios, there may not be a perfect match between algorithm and the current inspection scenario. For such scenarios, a cost function is used to measure the matching between an algorithm and an inspection scenario. The searching engine 306 will return the closest algorithm for the robot 12.

The database 34 may include an inspection library, which may be configured to store the inspection algorithms and trained models. In the training stage, the algorithms are stored as source files, which contain class definition and membership functions. They have standard and unified input and output interfaces. The models are stored and labeled with corresponding algorithm names for the classes to load.

The database 34 may also include sensory data stored for improving the already trained models. After re-training is done, the data may be removed from the cloud 18 (e.g., remote server 16), or moved to a backup data server.

The robot 12 receives the source files of the inspection algorithms and the associated models from the remote server 16 (e.g., via network interfaces 32, 104) and saves the source file in its current workspace and loads the file into the memory dynamically. The robot 12 then initiates an instance of the class. Using the name of the models stored in the class, the robot 12 loads the trained model into the class for inspection. During the inspection process, the robot 12 may utilize an inspection analytics component 308 to continuously process the collected sensory data and generate inspection results based on the inspection algorithm it is using.

Following one or more inspections, inspection results will be assembled by an inspection results and data post processing component 310 to generate an inspection report. In some embodiments, the report may be broadcasted back to the remote server 16. In some embodiments, human operators may suggest different inspection algorithms, or modifications to the existing inspection algorithms. The robot 12 may then repeat the inspection procedures using the new inspection algorithms described above. In some embodiments, models may be updated based on the inspection results.

Figure 5:
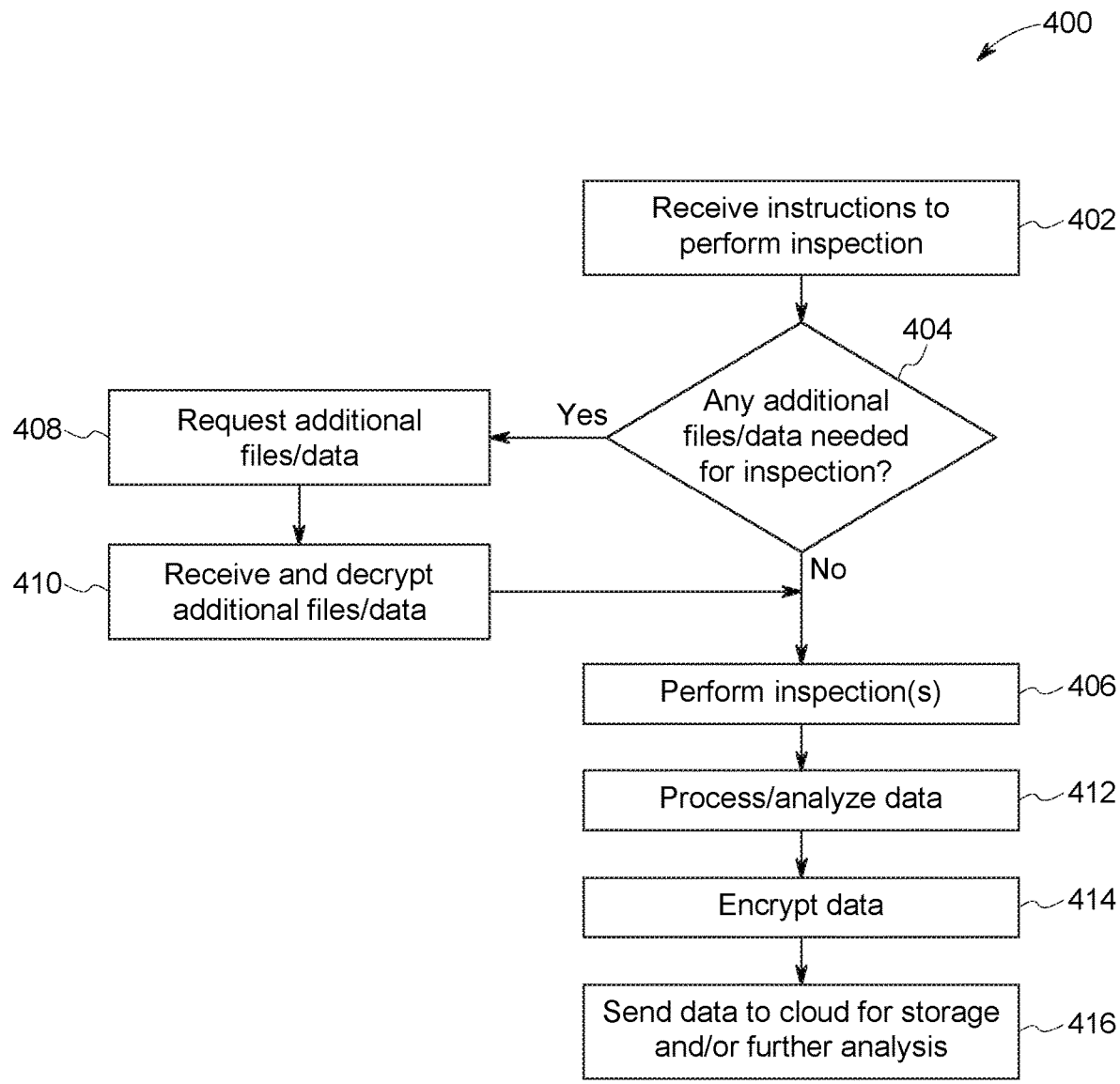
FIG. 5 is a flow chart of a process for performing an inspection via the robot of FIG. 1, in accordance with an embodiment.

FIG. 5 is a flow chart of a process 400 for performing an inspection of an asset via one or more robots. At block 402, the robot receives instructions (e.g., from the remote server via the cloud) to perform an inspection. At block 404, the robot determines whether any additional files or data are needed before the inspection is performed. If no additional files or data are needed, the process 400 proceeds to block 406 and performs the inspections. If additional files or data are needed, the process 400 proceeds to block 408 and requests the additional files or data from the remote server. The remote server retrieves the requested data or files, encrypts the data or files, and transmits them to the robot. At block 410, the robot receives and decrypts the data or files.

At block 406, the robot performs the inspection or inspections by following the pre-determined route and collecting data via one or more sensors. At block 412, the collected data is pre-processed, processed, and/or analyzed. As previously described, in some embodiments, the robot may simply send raw data back to the remote server. At block 414, the data or files are encrypted. As previously described, the encryption methods may include hashing, key exchange encryption, symmetric encryption, asymmetric encryption, or a combination thereof. At block 416 the encrypted data is sent to the cloud or to the remote server for storage and/or further analysis.

Figure 6:
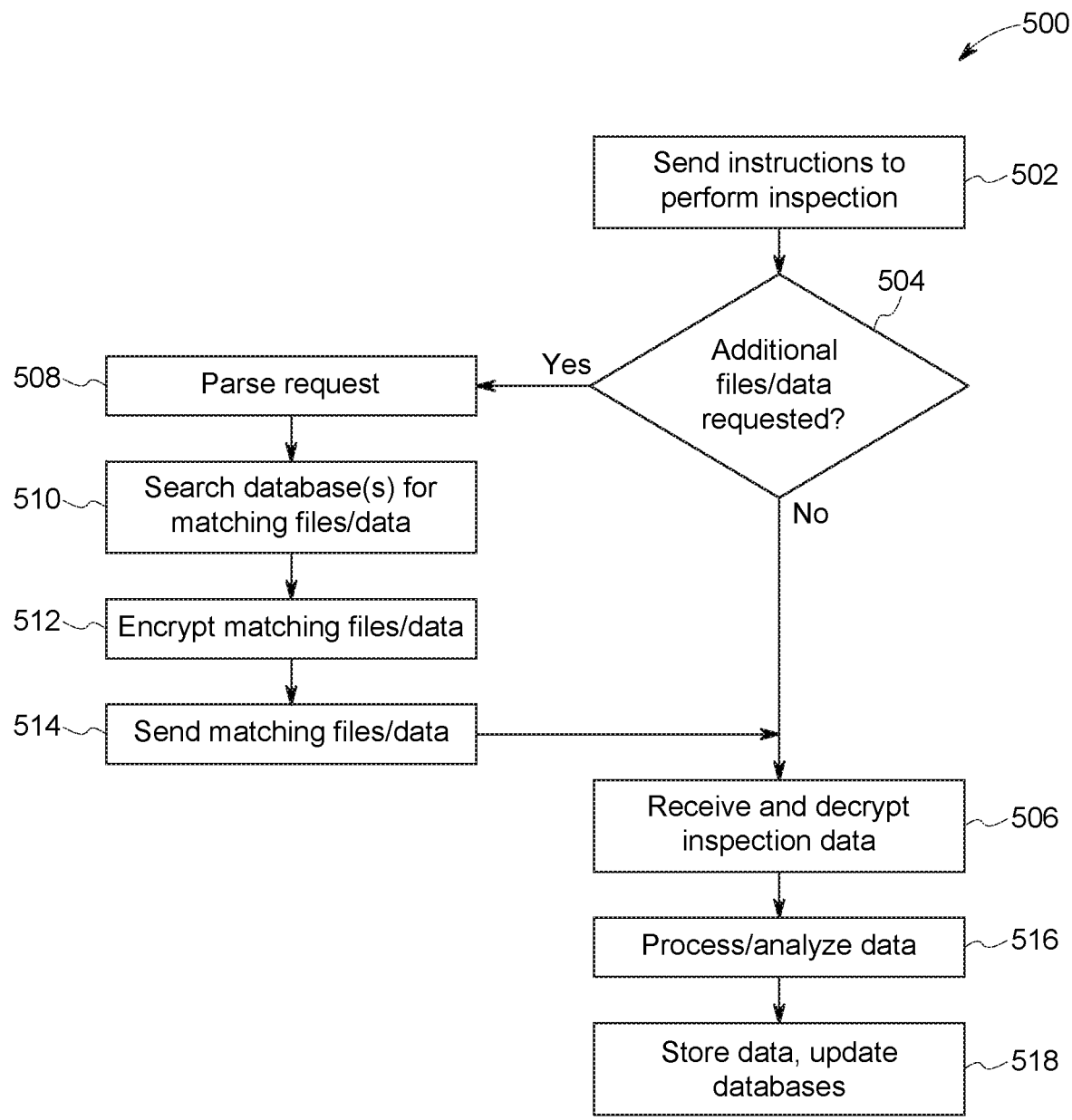
FIG. 6 is a flow chart of a process for coordinating an inspection by the robot of FIG. 1 via the cloud-based remote server of FIG. 1, in accordance with an embodiment.

FIG. 6 is a flow chart of a process 500 for coordinating an inspection of an asset by one or more robots via a cloud-based remote server. At block 502, the remote server sends the one or more robots instructions to perform an inspection. The robots determine whether any additional files and/or data are needed to perform the inspections. If additional files or data are needed, the robots will request the files or data from the remote server. At decision 504, the remote server determines whether or not any additional files or data have been requested by the robots. If no additional files or data are requested, the remote server waits to until inspection data is received from the robots (block 506).

If additional files or data are requested, the process 500 proceeds to block 508 and parses the request to determine what files or data have been requested. At block 510, the remote server searches one or more databases for matching files or data. If exact matches cannot be found, the files or data that are closest to those requested may be used. At block 512, the matching files or data is encrypted. As previously discussed, for data, standard encryption techniques may be used. For example, data may be encrypted via hashing, key exchange encryption, symmetric encryption, asymmetric encryption, or a combination thereof. To encrypt each algorithm, the algorithm is deconstructed into a list of defined primitives and the sequence of the primitives. The sequence of the primitives is then encrypted by normal encryption methods. That is, the algorithm primitives sequencing may be encrypted via hashing, key exchange encryption, asymmetric encryption, or a combination thereof. At block 514, the requested files or data are transmitted to the one or more robots via separate channels for data transmission and algorithm transmission. The remote server then waits while the one or more robots conduct the inspection and transmit data back to the remote server.

At block 506, the remote server receives the inspection data and decrypts the data. If the received data is raw or only partially processed, the remote server processes and analyzes the data at block 516. At block 518, the remote server stores the data (e.g., in the one or more databases) and, in some embodiments, updates data in the databases (e.g., models).

The presently disclosed techniques utilize one or more robots to perform an inspection of an asset. The one or more robots may be in communication with a remote server. Upon receiving instructions to perform an inspection, the one or more robots may request supplemental data or files from the remote server prior to the inspection. The one or more robots may conduct the inspection, collecting inspection data corresponding to the asset. In some embodiments, the robots may send raw inspection data to the remote server. In such embodiments, data processing and analysis is performed by the remote server. In other embodiments, the robots may perform pre-processing, partial processing, or full processing before sending the inspection data to the remote server. Data communicated between the robots and the remote server may be encrypted. For data transmission, typical encryption methods may be utilized. For algorithm transmission, the primitives of each algorithm may be defined and then the algorithm deconstructed into the sequence of the primitives. The sequence of the primitives is then encrypted via typical data encryption methods.

This written description uses examples to disclose the claimed subject matter, including the best mode, and also to enable any person skilled in the art to practice the disclosed subject matter, including making and using any devices or systems and performing any incorporated methods. The patentable scope of the claimed subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An asset inspection system, comprising:
a robot comprising a controller, wherein the controller is configured to receive inspection instructions indicative of an inspection task to be performed by the robot to collect inspection data of an asset; and
a server including a database, wherein the database stores a plurality of candidate inspection algorithms defining a plurality of possible inspection tasks performable by the robot, and wherein the server is configured to:
receive a request for data from the controller of the robot, wherein the data comprises a requested inspection algorithm that, when executed by the controller, enables the robot to perform the inspection task on the asset;
execute, via a searching engine, a cost function to locate and extract, based on the inspection instructions, a candidate inspection algorithm from the plurality of candidate inspection algorithms, wherein the candidate inspection algorithm is one of the plurality of candidate inspection algorithms most similar to the requested inspection algorithm; and
transmit the data to the robot, wherein the robot is configured to execute the candidate inspection algorithm to collect the inspection data of the asset and transmit the inspection data to the server.

2. The asset inspection system of claim 1, wherein the server is disposed remote from the robot, and wherein the robot and the server are configured to communicate with one another via a cloud interface.

3. The asset inspection system of claim 1, wherein the server is configured to encrypt the candidate inspection algorithm, prior to transmitting the candidate inspection algorithm to the robot, wherein the candidate inspection algorithm is encrypted by defining one or more primitives of the candidate inspection algorithm and encrypting a sequence of the one or more primitives of the candidate inspection algorithm.

4. The asset inspection system of claim 1, wherein the candidate inspection algorithm is transmitted from the server to the robot via an algorithm communication channel.

5. The asset inspection system of claim 1, wherein the data comprises a model of the asset.

6. The asset inspection system of claim 1, wherein the robot is configured to process, partially process, or pre-process the inspection data collected during execution of the candidate inspection algorithm.

7. The asset inspection system of claim 1, wherein the robot is configured to transmit raw inspection data collected during execution of the candidate inspection algorithm to the server.

8. The asset inspection system of claim 1, wherein the server comprises a parsing engine configured to parse the data requested by the robot.

9. An asset inspection robot, comprising:
a drive system comprising a motor;
a sensing system comprising one or more sensors configured to collect inspection data of an asset;
a network interface configured to communicate with a server storing a plurality of candidate inspection algorithms defining a plurality of possible inspection tasks performable by the asset inspection robot; and
a control system configured to:
receive inspection instructions indicative of an inspection task to be performed by the asset inspection robot to collect the inspection data of the asset;
request data from the server via the network interface, wherein the data comprises a requested inspection algorithm that, when executed by the control system, enables the asset inspection robot to perform the inspection task;
receive the data from the server, wherein the data comprises a candidate inspection algorithm extracted from the plurality of candidate inspection algorithms via a cost function executing on the server, wherein the candidate inspection algorithm is one of the plurality of candidate inspection algorithms most similar to the requested inspection algorithm;
control the asset inspection robot to execute the candidate inspection algorithm to collect the inspection data of the asset; and
transmit the inspection data to the server via the network interface.

10. The asset inspection robot of claim 9, wherein the control system comprises a data processing and analysis component configured to process or pre-process the inspection data.

11. The asset inspection robot of claim 9, wherein the asset inspection robot is configured to transmit raw inspection data to the server.

12. The asset inspection robot of claim 9, wherein the asset inspection robot is disposed remote from the server, and wherein the asset inspection robot and the server are configured to communicate with one another via a cloud interface.

13. The asset inspection robot of claim 9, wherein the control system comprises a mission planning system, wherein the mission planning system comprises a task configuration component configured to generate or modify configuration files and to implement a selected configuration file.

14. The asset inspection robot of claim 9, wherein the asset inspection robot comprises a land-based robot, an air-based robot, a liquid-based robot, or a combination thereof.

15. A method of inspecting an asset, comprising:
storing plurality of candidate inspection algorithms in a database of a remote server, wherein the plurality of candidate inspection algorithms defines a plurality of possible inspection tasks performable by a robot on the asset;
receiving, at a controller of the robot, inspection instructions indicative of an inspection task to be performed by the robot to collect inspection data of the asset;
requesting, via the controller, a first data set from the remote server, wherein the first data set comprise a requested inspection algorithm that, when executed by the controller, enables the robot to perform the inspection task on the asset;
executing, via a searching engine of the remote server, a cost function to locate and extract, based on the inspection instructions, a candidate inspection algorithm from the plurality of candidate inspection algorithms, wherein the candidate inspection algorithm is one of the plurality of candidate inspection algorithms most similar to the requested inspection algorithm;
receiving, at the controller, the first data set from the remote server, wherein the first data set includes the candidate inspection algorithm;
controlling the robot to execute the candidate inspection algorithm to perform the inspection task on the asset to collect a second data set indicative of the inspection data; and
transmitting the second data set to the remote server.

16. The method of claim 15, wherein the robot and the server are configured to communicate with one another via a cloud interface.

17. The method of claim 15, comprising pre-processing the second data set, partially processing the second data set, completely processing the second data set, or a combination thereof.

18. The method of claim 15, wherein transmitting the second data set to the remote server comprises transmitting raw inspection data.

* * * * *